No. 854,215. PATENTED MAY 21, 1907.
F. B. HOPEWELL.
TIRE CASE.
APPLICATION FILED APR. 27, 1906.
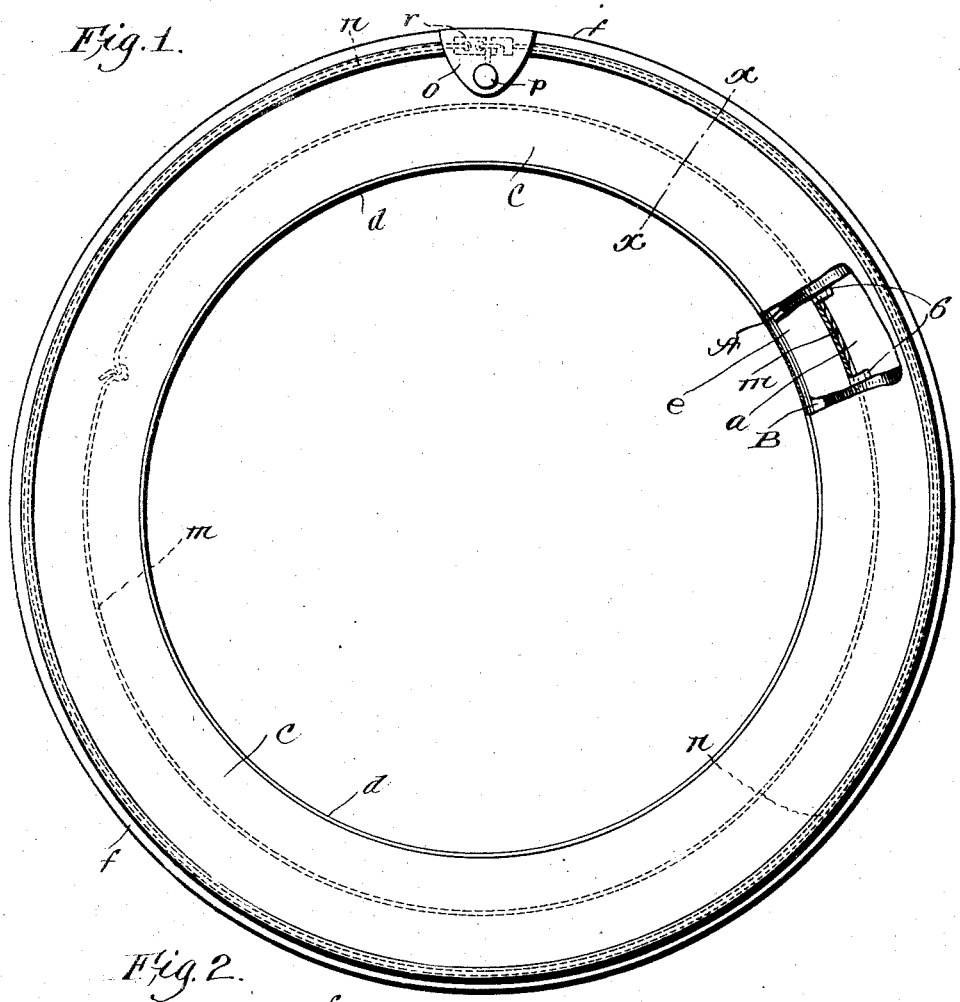
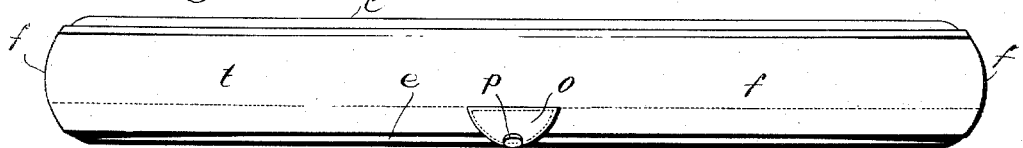
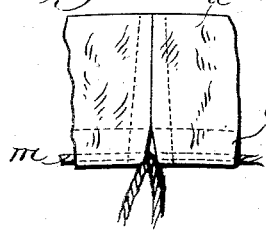
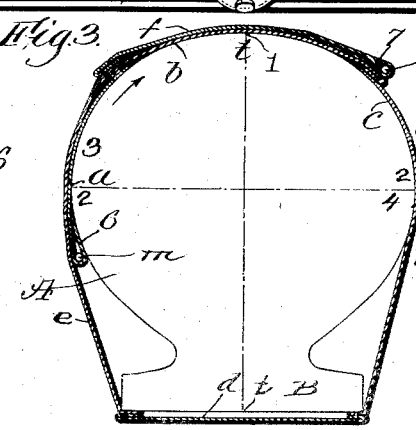
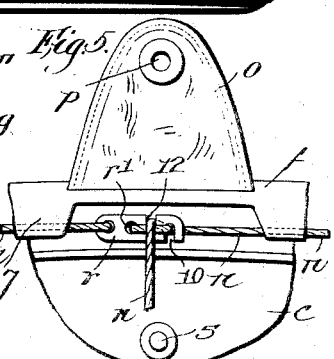
Witnesses
W. C. Lunsford
Walter N. Trott
Inventor
Frank B. Hopewell,
by Crosby Gregory Attys.

UNITED STATES PATENT OFFICE.

FRANK B. HOPEWELL, OF NEWTON, MASSACHUSETTS.

TIRE-CASE.

No. 854,215.  Specification of Letters Patent.  Patented May 21, 1907.

Application filed April 27, 1906. Serial No. 313,961.

*To all whom it may concern:*

Be it known that I, FRANK B. HOPEWELL, a citizen of the United States, residing in Newton, county of Middlesex, and State of Massachusetts, have invented an Improvement in Tire-Cases, of which the following description, in connection with the accompanying drawings, is a specification, like letters on the drawings representing like parts.

This invention has for its object the production of a novel tire case for enveloping and protecting a spare tire, such as used on automobiles.

Herein the tire case is of such width that it twice overlaps the tread face and one side of the spare tire, and the opposite edges of the case have each a pocket that receives a cord, the ends of the cord being exposed that they may be engaged and drawn upon, and when fastened will maintain the edges of the case in a smaller circle than the circle occupied by the tread face of the tire which the tire case is to cover. The cord may be of any strong flexible material as cord, or wire cord. I prefer to employ with the cord in the outermost pocket a snub device to hold the cord in place after it has been subjected to strain to pucker in or contract the outer edge of the tire case.

Figure 1 in side elevation represents a tire case containing a spare tire; Fig. 2 is a top view thereof; Fig. 3 is an enlarged transverse section thereof on a form representing typically a tire; Fig. 4 is a detail to be referred to, and Fig. 5 shows a binder with a snub device.

In the drawing, A will be supposed to represent a tire and B its usual holder. The tire case, of any suitable material, preferably water proof or water repellent material, is shown as composed of several pieces of material designated $a, b, c, d, e, f$, united to form a strip of the proper length, according to the circumference of the tread of the tire A, shown in outline, and of a width to inclose the tire, and overlap twice the tread face of the tire and one side thereof. One edge of the strip has a pocket 6 provided with a cord $m$, while the opposite edge has a pocket 7 provided with a cord $n$.

Having provided the pockets with suitable strong flexible cord $m, n$, or their recognized equivalents, I lay the part $b$ of the strip on the tread face of the tire A carrying the edge of the case having the pocket 6 provided with the cord $m$ down along the side 3 of the tire to a point below a line indicating the greatest diameter of the tire, such greatest diameter being indicated by the line 2—2. In this position the cord $m$ will be drawn taut and its ends tied, after which it will securely hold the edge of the case having the pocket 6 in a circle of smaller radius than the circle occupied by the tread face $t$ of the tire, and it will be understood that thereafter as long as the cord is unbroken, any amount of strain may be put on the tire case in the direction of the arrow without causing the pocketed edge to travel toward the tread face of the tire, as will be understood.

Having secured the end of the cord $m$ in the pocket 6 in the position shown in Fig. 3, I draw the tire case down over the side 4 of the tire, through the central opening of the tire, across the usual support B, if employed, upwardly over the side 3 of the tire, over the edge of the case having the pocket 6 and taut cord $m$, and across that part of the tire-case overlapping the tread face $t$ of the tire, drawing the edge of the case, having the pocket 7 provided with the cord $n$, sufficiently far beyond the line $t$—$t$ indicating the greatest depth of the tire, to leave the cord $n$ below the highest point of the depth of the tire at its tread face, and between said point and the side 4 of the tire. After this the cord $n$ will be subjected to such strain as to draw the edge of the case having the pocket 7 into a circle of smaller radius than the circle occupied by the tread face of the tire. When the cord $n$ has been subjected to such strain as to fit the pocketed edge 7 closely to the underlying part of the tire case, I have shown a snub device $r$ as connected with one end of the binder $n$, and the opposite end is led under the snub device, and out through a hole $r'$ therein, and by pulling on the free end of the cord $n$ outside the snub device, the cord may be drawn taut in the pocket 7 and when all the slack is taken up the cord may be led into the notch 10 thence behind the snub device and into the top notch 12.

I have shown the tire case opposite the point where the cord is connected as provided with a flap $o$ having a socket $p$ to engage a stud 5 on the underlying portion $c$ of the tire case said flap serving as a cover for the fastening member. It will be noticed that the tire case is ring-shaped or made as a ring, that is, without an end.

Having fully described my invention, what

I claim as new and desire to secure by Letters Patent is:—

1. An annular tire case composed of material having at each edge a longitudinal pocket, and a cord in each pocket to retain the pocketed edges of the case in a circle smaller than the circle defining the circumference of the tire.

2. An annular tire case composed of material having at one edge a longitudinal pocket and adapted to overlap a tire, said pocket being provided with a cord adapted to be drawn to contract the diameter of the edge of the cover that it may fit the tire.

3. An annular tire case composed of material having at both edges a longitudinal pocket and cords in said pockets strain on said cords contracting said edges as described.

4. An annular tire case composed of material having at one edge a longitudinal pocket, a cord in said pocket, and means to hold the cord in its stretched position after having been strained to pucker the edge of the case into its smaller circle.

5. An annular tire case composed of material having at one edge a longitudinal pocket, a cord in said pocket, and means to hold the ends of said cord in position after the cord has been strained to pucker the edge of the case into a smaller circle.

6. A tire case composed of material having at one edge a longitudinal pocket, a cord in said pocket, means to hold the ends of said cord in position after the cord has been strained to pucker the edge of the case into a smaller circle, and a flap to cover the united ends of the cord.

In testimony whereof, I have signed my name to this specification, in the presence of two subscribing witnesses.

FRANK B. HOPEWELL.

Witnesses:
   GEO. W. GREGORY,
   MARGARET A. DUNN.